(12) United States Patent
Burky et al.

(10) Patent No.: US 12,026,515 B2
(45) Date of Patent: Jul. 2, 2024

(54) INSTRUCTION FUSION

(71) Applicant: Arm Limited, Cambridge (GB)

(72) Inventors: William Elton Burky, Austin, TX (US); Nicholas Andrew Plante, Austin, TX (US); Alexander Cole Shulyak, Austin, TX (US); Joshua David Knebel, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/959,556

(22) Filed: Oct. 4, 2022

(65) Prior Publication Data
US 2024/0111535 A1    Apr. 4, 2024

(51) Int. Cl.
*G06F 9/30*   (2018.01)
*G06F 9/38*   (2018.01)

(52) U.S. Cl.
CPC ...... *G06F 9/30145* (2013.01); *G06F 9/30181* (2013.01); *G06F 9/3856* (2023.08)

(58) Field of Classification Search
None
See application file for complete search history.

(56) References Cited

U.S. PATENT DOCUMENTS

2014/0281397 A1* 9/2014 Loktyukhin ........ G06F 9/30094
712/208

* cited by examiner

*Primary Examiner* — Scott C Sun
(74) *Attorney, Agent, or Firm* — NIXON & VANDERHYE P.C.

(57) ABSTRACT

A data processing apparatus includes detection circuitry that detects a parent instruction and a child instruction from a stream of instructions. The parent instruction references a destination register that is referenced as a source register by the child instruction. Adjustment circuitry then adjusts the child instruction to produce an adjusted child instruction whose behaviour is logically equivalent to a behaviour of executing the parent instruction followed by the child instruction.

14 Claims, 5 Drawing Sheets

INSTRUCTION FUSION

TECHNICAL FIELD

The present disclosure relates to data processing and particularly the resilience of data processing circuits.

DESCRIPTION

It is desirable to increase the rate at which instructions are executed. One way of doing this is to reduce dependencies between instructions.

SUMMARY

Viewed from a first example configuration, there is provided a data processing apparatus comprising: detection circuitry configured to detect a parent instruction and a child instruction from a stream of instructions, wherein the parent instruction references a destination register that is referenced as a source register by the child instruction; and adjustment circuitry configured to adjust the child instruction to produce an adjusted child instruction whose behaviour is logically equivalent to a behaviour of executing the parent instruction followed by the child instruction.

Viewed from a second example configuration, there is provided a data processing method comprising: detecting a parent instruction and a child instruction from a stream of instructions, wherein the parent instruction references a destination register that is referenced as a source register by the child instruction; and adjusting the child instruction to produce an adjusted child instruction whose behaviour is logically equivalent to a behaviour of executing the parent instruction followed by the child instruction.

Viewed from a third example configuration, there is provided a non-transitory computer-readable medium to store computer-readable code for fabrication of a data processing apparatus comprising: detection circuitry configured to detect a parent instruction and a child instruction from a stream of instructions, wherein the parent instruction references a destination register that is referenced as a source register by the child instruction; and adjustment circuitry configured to adjust the child instruction to produce an adjusted child instruction whose behaviour is logically equivalent to a behaviour of executing the parent instruction followed by the child instruction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
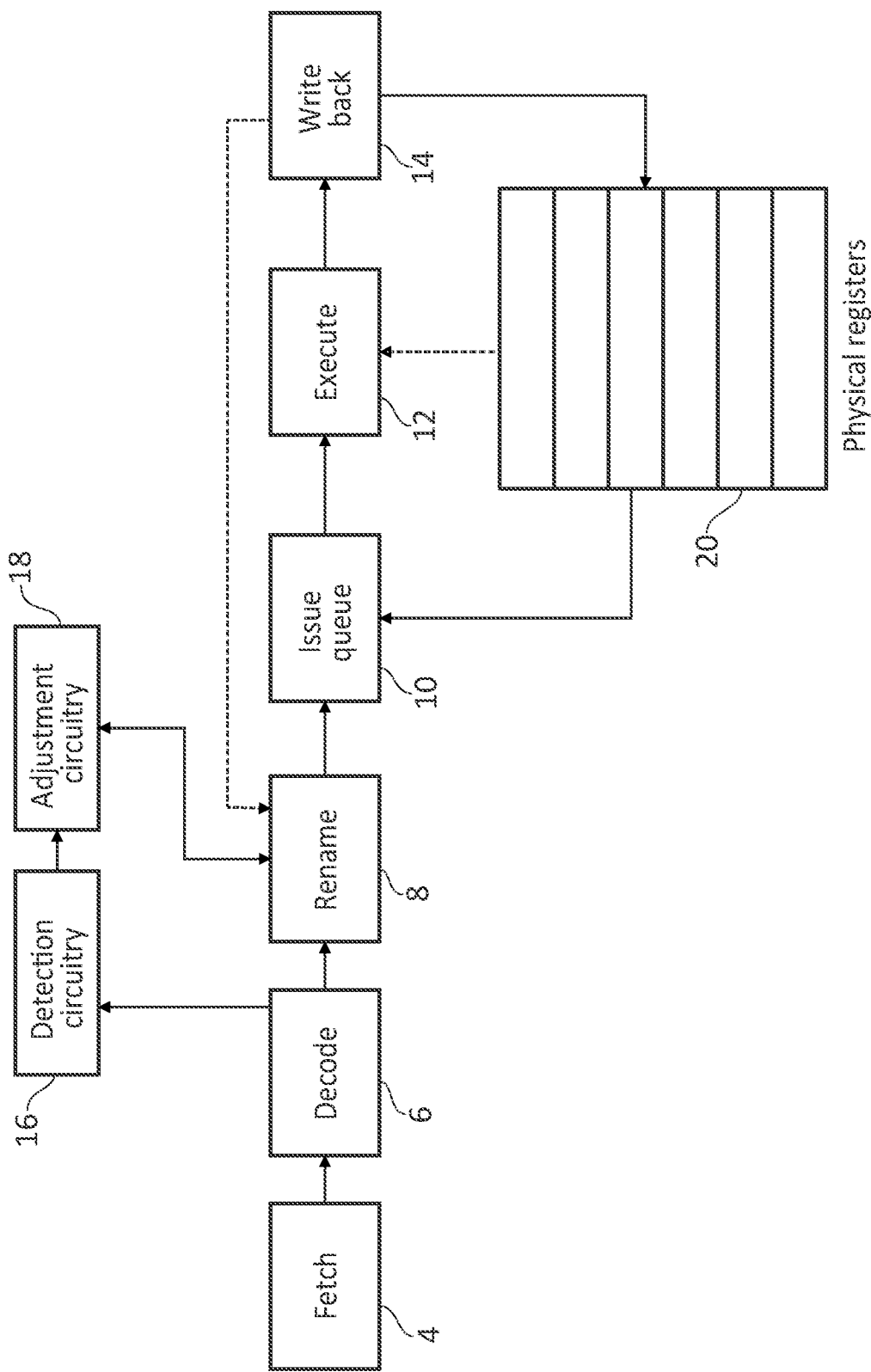
FIG. 1 schematically illustrates a portion of a processing pipeline in a data processing apparatus.

Before discussing the embodiments with reference to the accompanying figures, the following description of embodiments is provided.

In accordance with one example configuration there is provided a data processing apparatus comprising: detection circuitry configured to detect a parent instruction and a child instruction from a stream of instructions, wherein the parent instruction references a destination register that is referenced as a source register by the child instruction; and adjustment circuitry configured to adjust the child instruction to produce an adjusted child instruction whose behaviour is logically equivalent to a behaviour of executing the parent instruction followed by the child instruction.

It is sometimes the case that a stream of instructions includes a parent instruction that performs some operation and produces an output that is used by another (child) instruction to produce a final result. In these situations, it is possible to decouple the dependency between the child instruction and the parent instruction by modifying the child instruction to produce an adjusted child instruction. The adjusted child instruction is logically equivalent to performing the parent instruction and the child instruction and therefore the output of the adjusted child instruction is the same as if the child instruction was executed being dependent on the parent instruction. By breaking this dependency, it may be possible to execute both instructions in a single processor cycle, thereby improving the average instruction execution rate. Instructions can reference a particular register by specifying it as part of the instruction encoding.

In some examples, the parent instruction comprises one or more parent source operands; the parent instruction comprises one or more child source operands; and the adjusted child instruction is logically equivalent by comprising the one or more parent source operands and the one or more child source operands. A logical equivalence can be obtained by combining at least some operands from the child instruction and the parent instruction. For instance, if the parent instruction comprises the parameters 'x' and '2' and the child instruction comprises the parameters 'x+2' and '3' then this would be logically equivalent to the equation 'x+2+3" (or 'x+5').

In some examples, the parent instruction and the child instruction perform arithmetic or logical operations. Arithmetic operations involve simple mathematical operations such as add, subtract, divide, and multiply. They may also include more complicated operations including powers, logarithms, and trigonometric functions. Logical operations can be considered to be Boolean operations in which inputs can be considered to be true or false (although inputs can also be considered to be numeric, which can be translated into a series of true and false values via binary conversion). Logical operations include AND, OR, NOT, XOR and combinations thereof.

In some examples, the parent instruction is maintained in the instruction stream by the adjustment circuitry. In these examples, the parent operation is still performed in its originally intended manner even though its operation could be considered to be encapsulated within the adjusted child operation.

In some examples, in response to an exception occurring with the parent instruction, the adjusted child instruction is flushed. One reason for maintaining the parent instruction in its original manner is so that any exception that would have occurred as part of the parent instruction still occurs and can be handled as set out (if set out) in the original instruction stream. In these examples, the exception would still occur as part of the parent instruction rather than being performed as part of the adjusted child instruction. In response to the exception occurring, the adjusted child instruction is flushed (e.g. as part of a pipeline flush that may be caused by a rewind to the child instruction). The adjusted child instruction can then be reperformed or in some examples, the child instruction may be unable (or prevented) from being adjusted to form the adjusted child instruction.

In some examples, the adjustment circuitry is configured to adjust the child instruction to produce the adjusted child instruction in dependence on the child instruction and the parent instruction being separated by no more than a predetermined number of instructions in the stream of instructions. In these examples, there is a limit to how far separated the child instruction and the parent instruction can be within the instructions stream. This limit may be predicated on a number of instructions that can be decoded at once. The limit may also be dependent on the limits of storage circuitry used within the pipeline. For instance, where instruction renaming takes place, the limit might be dependent on a size of a rename queue within the rename circuitry, and how long it takes a physical register, that is deemed to no longer be used, to be made available for use once again.

In some examples, the data processing apparatus comprises: rename circuitry configured to rename the destination register and the source register from architectural to physical; and free physical register storage circuitry configured to identify a set of physical registers that are available for use, wherein the set of the physical registers that are available for use is updated in response to retirement of an instruction. In these examples, instructions in the instruction stream initially include encodings of architectural registers—which may have been selected (for instance) by a compiler in order to maintain data accuracy throughout a program. Those architectural registers can be renamed to physical registers by the rename circuitry in order to eliminate virtual dependencies within instructions and to allow the instructions to be executed (e.g. out of order) more efficiently. The free physical register storage circuitry includes an identity of the physical registers that are available for use at any one time (i.e. those that have not yet been assigned for a particular purpose). When instructions retire (e.g. once they have been executed and 'cleanup' of the pipeline takes place), physical registers that have been assigned and that are no longer needed can be re-added back to the free physical register storage circuitry for reuse as appropriate.

In some examples, the data processing apparatus comprises: reclaim queue circuitry configured to perform a delay of a rate at which the free physical register storage circuitry is updated by retirement of the parent instruction. Under normal circumstances, as previously explained, when a physical register is no longer used, it is immediately 'freed' by being added back to the free physical register storage circuitry so that it can be used. However, in these examples, this could be problematic, because the physical register might be required by the adjusted child instruction (e.g. as one of the operands). Consequently, a delay is introduced in order to prevent the physical register from being reused until such time as it can be accessed by the adjusted child instruction.

In some examples, the delay corresponds with a maximum permitted distance between the parent instruction and the child instruction in the stream of instructions. The delay until a freed physical register can be reused is dependent on the maximum distance (e.g. a number of instructions) between the parent instruction and child instruction. In particular, as the distance between these instructions increases, the need for a further physical instruction also increases. In a worst case scenario, every instruction between the parent and child instructions will allocate data to a register, thereby necessitating a new physical register in which to write the data. Because of this, as the distance increases, a longer delay is required. The correspondence may therefore be such that the delay is equivalent to the instructions between the parent and child instruction being processed (e.g. scheduled for execution by execution units). The correspondence may also allow for some deviation from this number, depending on how the pipeline is organised. For instance, the delay may be equivalent to the time taken to execute the instructions between the parent and child instruction+/−2 or +/−1.

In some examples, the maximum permitted distance is a number of destination registers in instructions between the parent instruction and the child instruction. Instructions that do not use a destination register may not participate in renaming and so may have no effect on the maximum permitted distance. As above, the correspondence may allow for +/−2 or +/−1 such instructions.

In some examples, the reclaim queue circuitry is a FIFO queue that stores a new entry each time an instruction in the stream of instructions is executed that has a destination register. A first-in first-out (FIFO) queue is one in which data is removed in the same order in which is added. For instance, if data is added in the order A, B, and C then it is removed in the order A, B, and C. In these examples, each time a destination register is encountered in an instruction (e.g. a register whose data may be modified in response to execution of the instruction), that register is added to the FIFO queue. The FIFO queue may be circular so that any previous register that was listed in that entry of the FIFO queue now becomes available (i.e. it is added back to the free physical register storage circuitry) since a sufficient delay has occurred before the register is freed.

In some examples, the data processing apparatus comprises: parent register storage circuitry configured to store a relationship between one of the physical registers used by the parent instruction as the destination register and one of the architectural registers used by the parent instruction as the destination register. The parent register storage circuitry thereby indicates the virtual-to-physical register mapping using for a destination register of the parent instruction, which allows that destination register to be used as a source register in the adjusted child instruction.

In some examples, a size of parent register storage circuitry corresponds with a maximum permitted distance between the parent instruction and the child instruction in the stream of instructions. As above, the capacity of the parent register storage circuitry is limited by how far apart the parent and child instructions can be. As the parent and child instructions can be further apart, it becomes necessary to store more mappings between physical and virtual registers that are allocated (it becomes necessary to hold on to each mapping for longer) so that the mapping can be used in the generation of the adjusted child instruction. As above, the correspondence may depend on the time taken to execute the instructions between the parent and child instructions and may be +/−2 or +/−1 depending on the order of the pipeline and the point at which registers are assigned by the rename circuitry.

In some examples, the maximum permitted distance is a number of destination registers in instructions between the parent instruction and the child instruction. As above, the permitted distance might depend on instructions that have destination registers and therefore participate in renaming Again, the delay may include or exclude one or two such instructions depending on the operation of the pipeline in respect of renaming and the assignment of registers to instructions as well as the release of those instructions.

Particular embodiments will now be described with reference to the figures.

FIG. 1 schematically illustrates a portion of a processing pipeline in a data processing apparatus 2. The pipeline includes a number of stages including a fetch stage 4, a decode stage 6, a rename stage 8, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 12, 14 of the pipeline may be different from the instructions fetched from memory and the term "instruction" should be interpreted as encompassing a micro-operation.

The apparatus 2 has a number of physical registers 20 available for storing data values. A register renaming stage 8 performs register renaming for the decoded instructions (or micro operations) to map architectural register specifiers specified by the instructions to physical register specifiers identifying one of the physical registers 20. The instruction set architecture may support a certain number of architectural registers which are visible to the programmer. For example, a 4- or 5-bit register field in the instruction encoding may specify one of 16 or 32 different architectural register specifiers. However, to allow hazards between instructions specifying the same architectural register specifier to be resolved or to permit out of order or parallel processing of instructions, a greater number of physical registers may be provided, and the register rename stage 8 may map the architectural register specifiers in the decoded instructions to corresponding physical registers.

The renamed instructions now specifying physical register specifiers are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions.

When execution of the instruction is complete in the execute stage 12, the instruction is passed to the write back stage 14, which writes a result of the instruction to a physical register 20. Also as part of the writeback stage, the physical register may be 'released' so that it can be assigned to another architectural register (as will be illustrated with respect to FIG. 3).

In the example shown in FIG. 1, for renamed instructions which specify one or more physical registers from which data values are to be read, the reading of the physical register takes place while the instruction is pending in the issue queue 10. However, other embodiments may read the physical registers 20 at the execute stage 12 instead, as shown by the dotted line in FIG. 1.

In general the rename stage has access to an indication of which physical registers are available or unavailable for selection. When an instruction which writes to a register is received from the decode stage 6, the rename stage 8 generates a new register mapping for the architectural register specified as the destination register for the instruction. The rename stage 8 selects a physical register which is indicated as available and updates one or more tables to include a rename entry mapping the destination architectural specifier to the selected physical register.

In these examples, detection circuitry 16 is provided, which is able to detect the presence of two instructions with the stream of instructions that can be fused together. This might occur by monitoring the instructions stream itself or an output of the decode stage, for instance. In any event, if such a condition is met, then the detection circuitry notifies the adjustment circuitry to perform an adjustment to the instructions by altering the encoding of the latter instruction (or rather its micro-operations) to produce an adjusted instruction. The adjusted instruction performs in the same way as a result of performing the two instructions that were detected by the detection circuitry.

As a consequence of this, the two instructions can be made non-dependent on each other. Consequently, a result of the two instructions being executed can be made available after a smaller number of processor cycles that if the two instructions have dependencies. For instance, by removing the dependency, the two instructions could execute in parallel or could be executed out of order in order to improve the average instruction execution rate.

Figure 2:
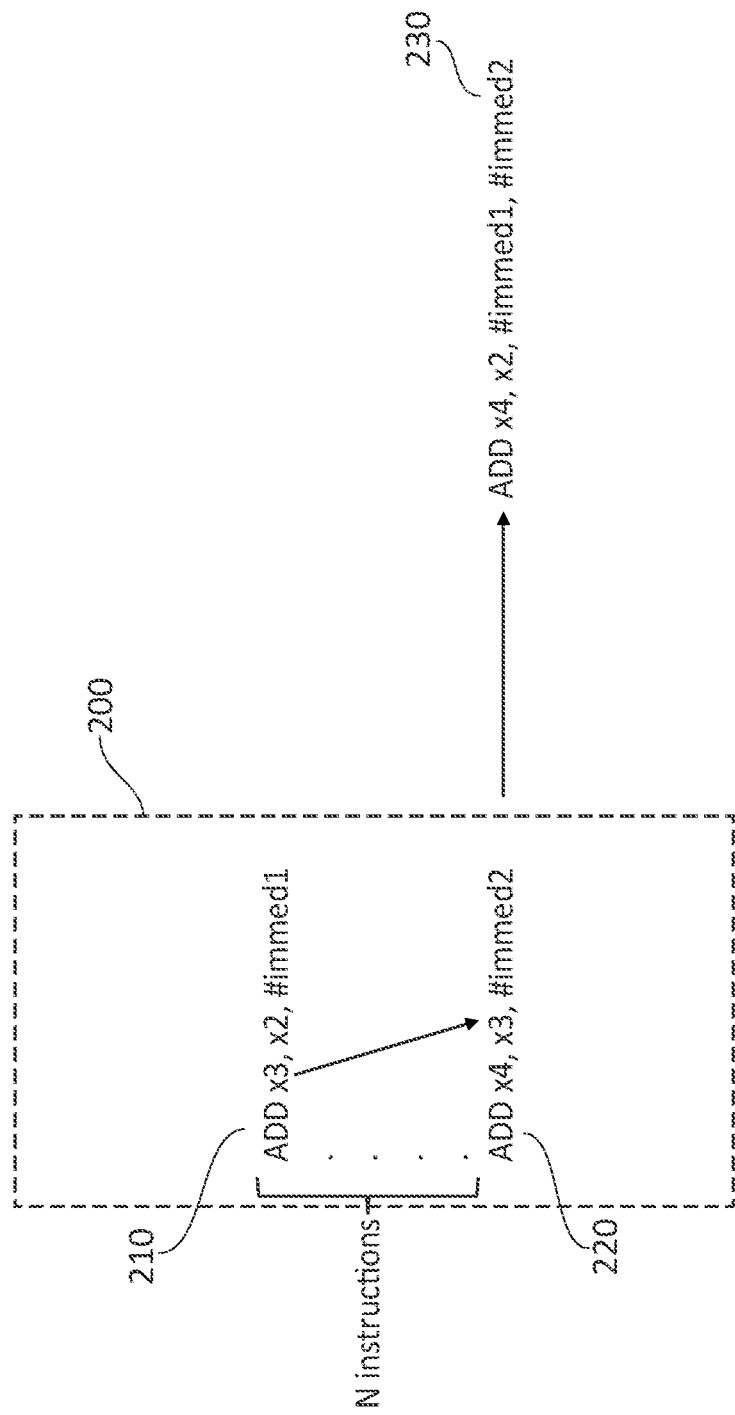
FIG. 2 shows an example of the instruction fusion taking place.

FIG. 2 shows an example of the instruction fusion taking place. In this example, there is a stream of instructions 200. This includes a two-source parent instruction 210 that adds the contents of (architectural) register x2 and an immediate value #immed1, and stores the results in a register x3. The stream 200 also includes a two-source child instruction 220 that adds the contents of a register x3 to a second immediate value #immed2 and stores the result in (architectural) register x4. The parent 210 and child instructions are separated by N−1 other instructions (N>=1) having one destination register each although this need not be the case; the parent 210 and child 220 instructions could be adjacent in the stream 200.

In the stream 200, the child instruction 220 is dependent on a result of executing the parent instruction 210. That is, because the child instruction 220 has a source register x3 that is a destination register of the parent instruction 210, the child instruction 220 cannot ordinarily be executed until the parent instruction 210 has completed execution. Assuming each instruction can be executed in one cycle, this would therefore require two processor cycles to be executed—even if there were two ALUs in the execution circuitry 12 to execute the two instructions simultaneously.

However, it will be appreciated that the child instruction 220 can be adjusted to produce an adjusted child instruction 230, which is logically equivalent to performing the parent instruction 210 followed by the child instruction 220. In particular, by adjusting the two-source child instruction 220 to a three-source adjusted child instruction 230, it is possible to provide a single instruction 230 that adds the two sources (x2, #immed1) of the parent instruction 210 with the extra source (#immed2) of the child instruction 220. Consequently, the adjusted child instruction 230 is no longer dependent on the parent instruction 210—in particular, the output of the parent instruction 210 is not required for the correct execution of the adjusted child instruction 230.

There are a number of ways of detecting that adjustment is possible. In practice, the register dependency described above should be met. In addition, the adjusted child instruction 230 should be able to express a logical equivalence of combining the parent 210 and child 220 instructions. In the present case, this is possible via three-source instructions. Generally, these instructions will be logical and/or arithmetic instructions. Note that it may not be practical to perform any kind of logic on the operands. In practice, it may be useful for the detection circuitry to be provided with a list of formulas that allow the combination of a parent instruction and child instruction to produce an adjusted child instruction. Such a table could be consulted once the relationship between the registers has been established (and perhaps once it has been established that the instructions themselves are of a type—e.g. ALU based—for which instruction fusion is possible). As noted here, two two-source instructions might be convertible into a three-source instruction. However other logical equivalences might apply. For instance, an AND instruction followed by a NOT instruction on the result is logically equivalent to performing an OR instruction on the inputs to the AND instruction. A full set of logical equivalences will clearly depend on the underlying architecture and its instruction set.

By removing the dependency, more options are available for out-of-order execution than would otherwise be available. Indeed, if two ALUs are provided, then it is even possible for both the parent instruction 210 and the adjusted child instruction 230 to be executed simultaneously.

As previously explained, the architectural registers (x2, x3, x4, etc.) are assigned to physical registers (p1, p5, p6, etc.). In this example, if another instruction does not operate on the register x2, then the rename circuitry 8 would normally cause the assignment of x2 to a physical register to be freed so that the physical register mapped to x2 could be reused. However, if other data is written to x2 then when x2 is used by the adjusted child instruction 230, then the adjusted child instruction 230 would produce an incorrect result. Consequently, it is necessary to keep the mapping until such time as the adjusted child instruction 230 is executed.

Figure 3:
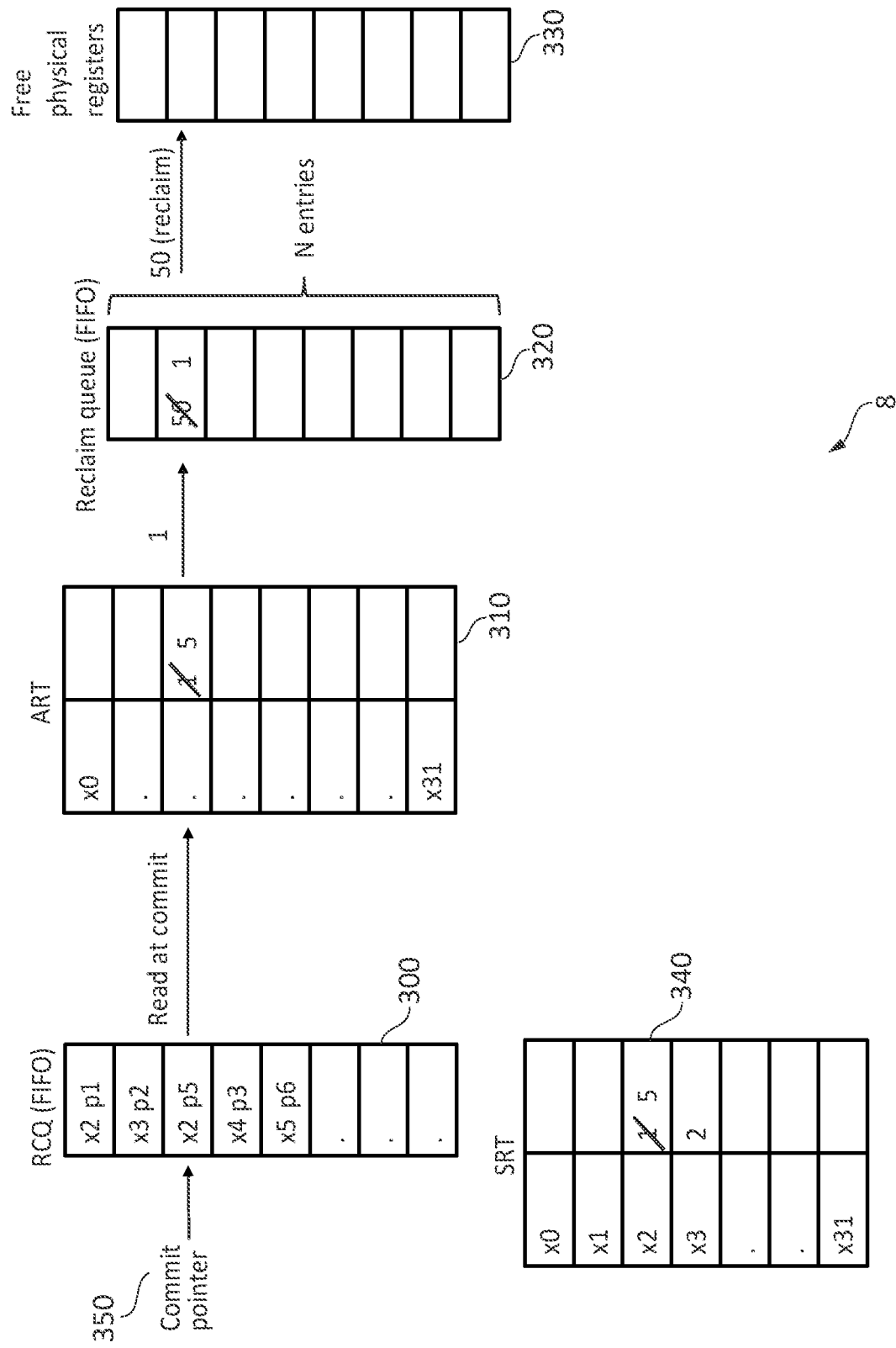
FIG. 3 illustrates the renaming stage, with a delay for freed physical registers, in more detail.

FIG. 3 illustrates the renaming stage 8, with a delay for freed physical registers, in more detail. The Speculative Register Table (SRT) 340 provides an indication of the current mapping that are in use by instructions that have not yet been committed. For instance, in the example of FIG. 3, architectural register x2 was mapped to physical register p1, but this was been replaced with the register x5 (e.g. by an instruction between the parent instruction 210 and the child instruction 220 that creates a new result for x2 that is written into p5). The instruction is in the process of being committed (the commit pointer currently points to the entry that maps x2 to p5).

Note that the parent writing x3 will have used the old value of x2 (p1). Meanwhile, the adjusted child writing x4 will also use the old value of x2 (p1) rather than the new value (p5). A mechanism for this is illustrated with respect to FIG. 4.

A Register Commit Queue (RCQ) 300 shows destination registers assigned to instructions that are waiting to be committed. The destination registers include both the architectural register and the physical register for each instruction. A commit pointer 350 points to a next entry in the RCQ 300 that is to be committed. For instance, currently, the commit pointer 350 is pointing to the parent instruction 210 in which data is to be written to an architectural register x2 that is mapped to a physical register p5.

When that instruction is committed, the data in the entry is read and passed to an Architected Rename Table (ART) 310. This table stores the most recent (active) mapping between physical and architectural registers based on committed instructions. For instance, the table shows that until the parent instruction 210 is committed, x2 pointed to physical register p1. However, when the parent instruction 210 is committed, x2 now points to p5. Consequently, until a new assignment is made, an instruction that refers to x2 is now referring to p5. The old physical register (p1) is output. Since this physical register p5 is no longer mapped to x2, this would ordinarily mean that p5 could be reused. However, as explained above, the data in p5 is still required by the adjusted child instruction 230 and so the physical register p5 cannot yet be freed.

There are a number of ways to delay the freeing. One option would be to wait until execution of the adjusted child instruction 230 has completed. However, a simpler option is to simply delay freeing the physical registers produced by all instructions by a period equivalent to the maximum window between the parent instruction 210 and adjusted child instruction 230 so that the registers written to by the parent instruction 210 cannot be freed until any adjusted child instruction 230 has had the chance to execute.

In these examples, therefore, the "freed" register p1 is passed into a circular reclaim queue 320, which is a type of FIFO queue. Each time, a register to be freed is inserted into the reclaim queue, the pointer in the reclaim queue 320 is advanced. Each time a new value is written to the reclaim queue 320, any existing value in that entry is output. Here, it is shown that a previous register p50 is overwritten by the register p1 and therefore the old register p50 is output. This physical register can now genuinely be freed, which occurs by writing it to a set of free physical registers 330 ready for reassignment.

In this example, the size of the circular reclaim queue 320 is defined by N, which relates to the maximum number of destination registers in instructions that can separate the parent instruction and the child instruction, as shown in FIG. 2. Since the reclaim queue 320 contains N entries, there can be N entries stored in the reclaim queue before the oldest entry must be rewritten. Assuming that the oldest entry belongs to the parent instruction, and assuming that each instruction causes a new entry to be inserted into the reclaim queue 320, there can be a further N−1 destination registers used before the child instruction is encountered. At that point, one further instruction could cause the entry for the source register in the parent application to be freed, thereby creating the possibility that the data in the source register will be changed before the adjusted child instruction is executed and corrupting that instruction.

N therefore depends on the maximum number of new register assignments that can occur per instruction. Typically, this will be one per instruction. In that case, there is approximately a one-to-one mapping between the size of the reclaim queue 320 and the number of instructions that can separate the parent and child instructions. In practice, this value might be plus or minus one or two depending on the order of events of the rename circuitry and the point in which data is obtained from the physical registers 20. In addition, feedback paths may enable data to be passed other than through the registers themselves, which might alter this relationship slightly.

Figure 4:
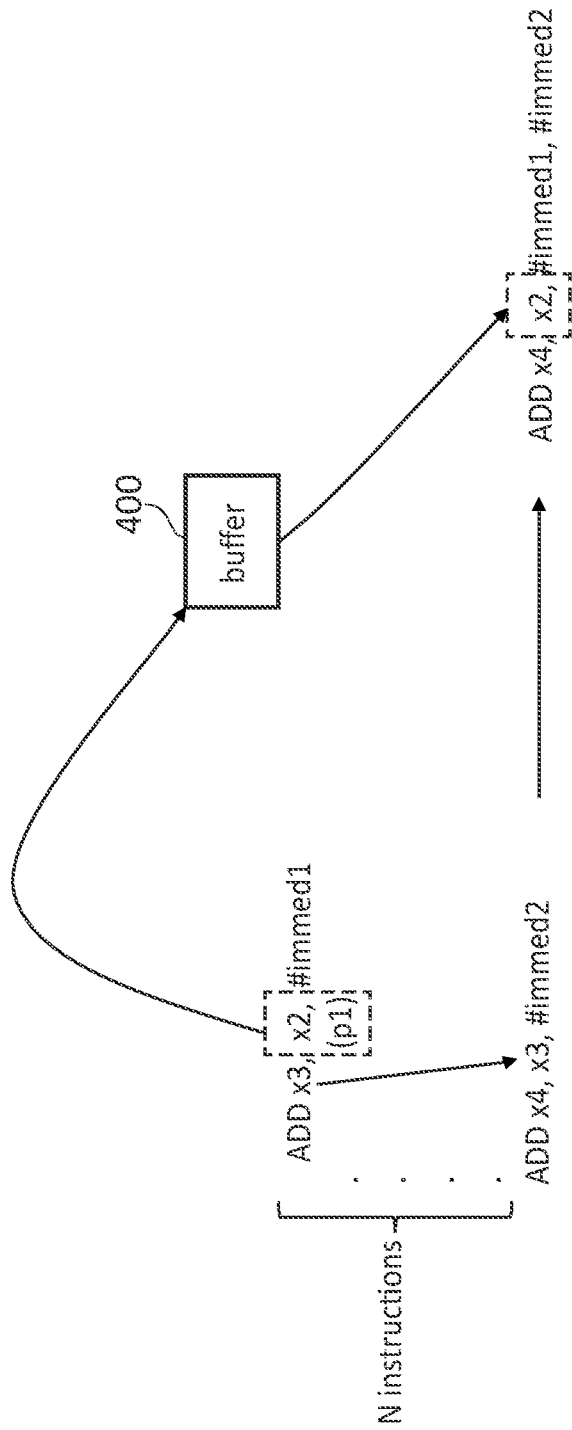
FIG. 4 illustrates a further storage circuit.

FIG. 4 illustrates a further storage circuit 400, which is used to store the original mapping between the physical register and the architectural register used in the parent instruction. It is of course important to maintain this mapping so that when the adjusted child instruction is executed, it is known to access (in this example) physical register p1 rather than another physical register (e.g. when register x2 was reassigned to p5). There are a number of ways to do this. FIG. 4 suggests the use of a buffer 400 that temporarily stores mappings. This period might be a rolling window of the most recent N instructions (in a similar manner to that used for the reclaim queue 320). In other examples, the mapping might be made available via feedback paths.

Figure 5:
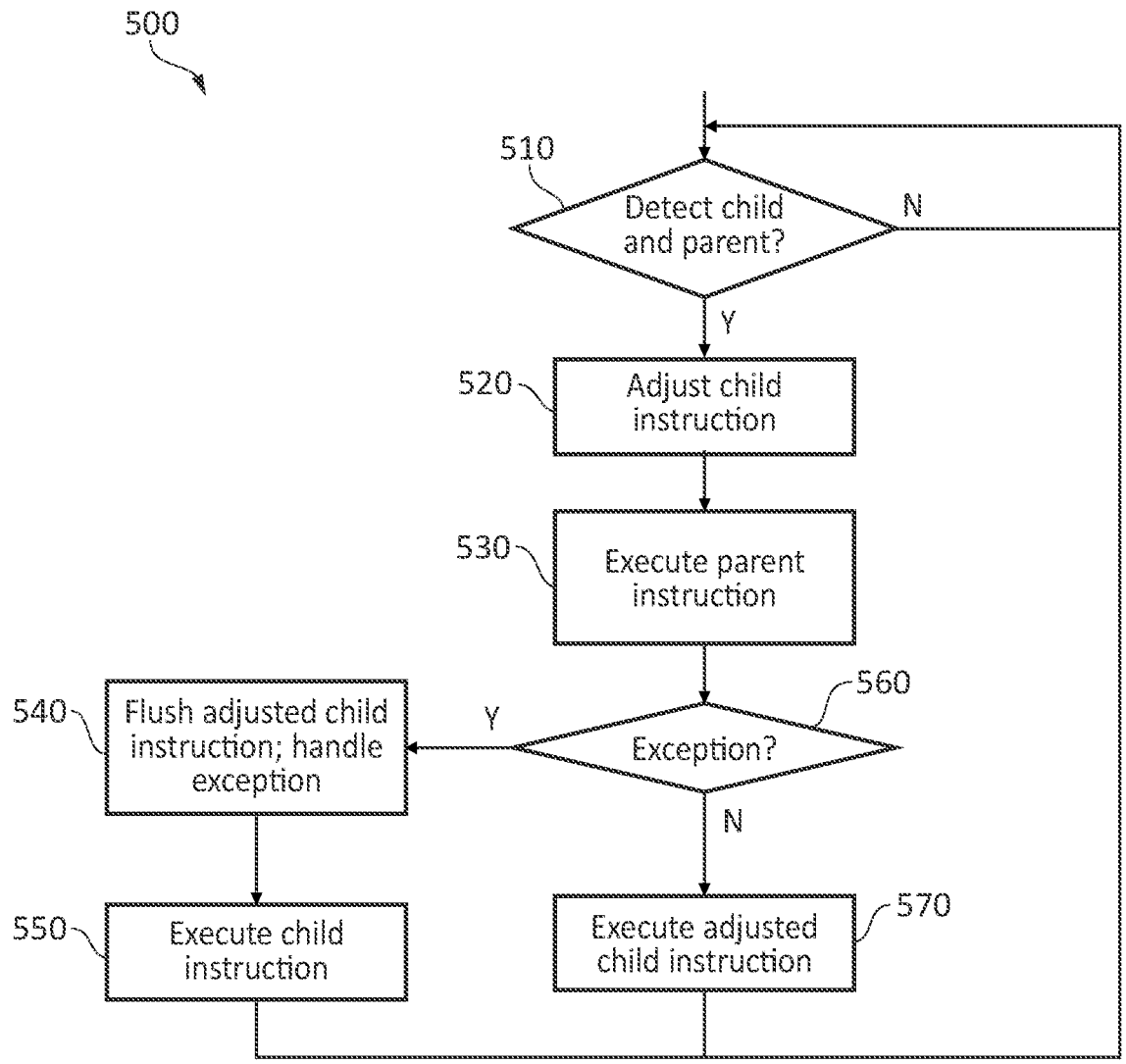
FIG. 5 shows an example of the present technique in the form of a flowchart.

FIG. 5 shows an example of the present technique in the form of a flowchart 500. This process also illustrates the situation when an exception occurs in respect of the parent instruction 210. At step 510, it is determined whether an appropriate child and parent combination have been detected within the window of N instructions. If not, the process returns to step 510 to see if such a window is detected. Otherwise, at step 520, the child instruction 220 is adjusted in order to become logically equivalent to the combination of the parent instruction 210 and child instruction 220. The parent instruction is then executed at step 530—in other words, the parent instruction 210 is maintained despite the adjustment to the child instruction 220. At step 560, it is determined whether an exception occurs. If not, the adjusted child instruction is executed at step 570, and the process returns to step 510. Otherwise, if an exception occurs then the adjusted child instruction is flushed at step 540 and the exception is handled in accordance with any exception handling routines. These could involve presenting an error to the user, re-executing the instruction, running a recovery routing, or some combination thereof. Then, at step 550, the child instruction (rather than the adjusted child instruction) is executed and the process returns to step 510. The flush process causes the execution to 'rewind' the point at which the parent instruction has been executed. Furthermore, by specifically flushing the adjusted child instruction, execution occurs as per the original stream of instructions.

In other embodiments, the adjusted child instruction could be re-executed with the same exception handling process being executed in the event of the exception occurring a second time.

Accordingly, the above process illustrates how certain types of instructions can be fused together in order to eliminate dependencies between them. It will be appreciated that the technique is not limiting to the fusing of two instructions into one instruction and that the same techniques can be applied to other combinations of instruction. By eliminating the dependencies between the instructions, it is possible to improve the scheduling of instructions and to improve the average instruction processing rate of the system.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
    detection circuitry configured to detect a parent instruction and a child instruction from a stream of instructions, wherein the parent instruction references a destination register that is referenced as a source register by the child instruction; and
    adjustment circuitry configured to adjust the child instruction to produce an adjusted child instruction whose behaviour is logically equivalent to a behaviour of executing the parent instruction followed by the child instruction.

2. The data processing apparatus according to clause 1, wherein
    the parent instruction comprises one or more parent source operands;
    the parent instruction comprises one or more child source operands; and
    the adjusted child instruction is logically equivalent by comprising the one or more parent source operands and the one or more child source operands.

3. The data processing apparatus according to any preceding clause, wherein
    the parent instruction and the child instruction perform arithmetic or logical operations.

4. The data processing apparatus according to any preceding clause, wherein
    the parent instruction is maintained in the instruction stream by the adjustment circuitry.

5. The data processing apparatus according to clause 4, wherein
    in response to an exception occurring with the parent instruction, the adjusted child instruction is flushed.

6. The data processing apparatus according to any preceding clause,
    the adjustment circuitry is configured to adjust the child instruction to produce the adjusted child instruction in dependence on the child instruction and the parent instruction being separated by no more than a predetermined number of instructions in the stream of instructions.

7. The data processing apparatus according to clause 4, comprising:
    rename circuitry configured to rename the destination register and the source register from architectural to physical; and
    free physical register storage circuitry configured to identify a set of physical registers that are available for use, wherein the set of the physical registers that are available for use is updated in response to retirement of an instruction.

8. The data processing apparatus according to clause 7, comprising:
    reclaim queue circuitry configured to perform a delay of a rate at which the free physical register storage circuitry is updated by retirement of the parent instruction.

9. The data processing apparatus according to clause 8, wherein
    the delay corresponds with a maximum permitted distance between the parent instruction and the child instruction in the stream of instructions.

10. The data processing apparatus according to clause 9, wherein
    the maximum permitted distance is a number of destination registers in instructions between the parent instruction and the child instruction.

11. The data processing apparatus according to clause 9, wherein
    the reclaim queue circuitry is a FIFO queue that stores a new entry each time an instruction in the stream of instructions is executed that has a destination register.

12. The data processing apparatus according to clause 7, comprising:
    parent register storage circuitry configured to store a relationship between one of the physical registers used by the parent instruction as the destination register and one of the architectural registers used by the parent instruction as the destination register.

13. The data processing apparatus according to clause 12, wherein
    a size of parent register storage circuitry corresponds with a maximum permitted distance between the parent instruction and the child instruction in the stream of instructions.

14. The data processing apparatus according to clause 13, wherein
    the maximum permitted distance is a number of destination registers in instructions between the parent instruction and the child instruction.

15. A data processing method comprising:
    detecting a parent instruction and a child instruction from a stream of instructions, wherein the parent instruction references a destination register that is referenced as a source register by the child instruction; and
    adjusting the child instruction to produce an adjusted child instruction whose behaviour is logically equivalent to a behaviour of executing the parent instruction followed by the child instruction.

16. A non-transitory computer-readable medium to store computer-readable code for fabrication of a data processing apparatus comprising:
    detection circuitry configured to detect a parent instruction and a child instruction from a stream of instructions, wherein the parent instruction references a destination register that is referenced as a source register by the child instruction; and
    adjustment circuitry configured to adjust the child instruction to produce an adjusted child instruction whose behaviour is logically equivalent to a behaviour of executing the parent instruction followed by the child instruction.

We claim:

1. A data processing apparatus comprising:
   detection circuitry configured to detect a parent instruction and a child instruction from a stream of instructions, wherein the parent instruction references a destination register that is referenced as a source register by the child instruction;
   adjustment circuitry configured to adjust the child instruction to produce an adjusted child instruction whose behaviour is logically equivalent to a behaviour of executing the parent instruction followed by the child instruction;
   rename circuitry configured to rename the destination register and the source register from architectural to physical; and
   free physical register storage circuitry configured to identify a set of physical registers that are available for use, wherein the set of the physical registers that are available for use is updated in response to retirement of an instruction, wherein
   the parent instruction is maintained in the instruction stream by the adjustment circuitry.

2. The data processing apparatus according to claim 1, wherein
   the parent instruction comprises one or more parent source operands;
   the parent instruction comprises one or more child source operands; and
   the adjusted child instruction is logically equivalent by comprising the one or more parent source operands and the one or more child source operands.

3. The data processing apparatus according to claim 1, wherein
   the parent instruction and the child instruction perform arithmetic or logical operations.

4. The data processing apparatus according to claim 1, wherein
   in response to an exception occurring with the parent instruction, the adjusted child instruction is flushed.

5. The data processing apparatus according to claim 1,
   the adjustment circuitry is configured to adjust the child instruction to produce the adjusted child instruction in dependence on the child instruction and the parent instruction being separated by no more than a predetermined number of instructions in the stream of instructions.

6. The data processing apparatus according to claim 1, comprising:
   reclaim queue circuitry configured to perform a delay of a rate at which the free physical register storage circuitry is updated by retirement of the parent instruction.

7. The data processing apparatus according to claim 6, wherein
   the delay corresponds with a maximum permitted distance between the parent instruction and the child instruction in the stream of instructions.

8. The data processing apparatus according to claim 7, wherein
   the maximum permitted distance is a number of destination registers in instructions between the parent instruction and the child instruction.

9. The data processing apparatus according to claim 7, wherein
   the reclaim queue circuitry is a FIFO queue that stores a new entry each time an instruction in the stream of instructions is executed that has a destination register.

10. The data processing apparatus according to claim 1, comprising:
    parent register storage circuitry configured to store a relationship between one of the physical registers used by the parent instruction as the destination register and one of the architectural registers used by the parent instruction as the destination register.

11. The data processing apparatus according to claim 10, wherein
    a size of parent register storage circuitry corresponds with a maximum permitted distance between the parent instruction and the child instruction in the stream of instructions.

12. The data processing apparatus according to claim 11, wherein
    the maximum permitted distance is a number of destination registers in instructions between the parent instruction and the child instruction.

13. A data processing method comprising:
    detecting a parent instruction and a child instruction from a stream of instructions, wherein the parent instruction references a destination register that is referenced as a source register by the child instruction;
    adjusting the child instruction to produce an adjusted child instruction whose behaviour is logically equivalent to a behaviour of executing the parent instruction followed by the child instruction;
    renaming the destination register and the source register from architectural to physical; and
    identifying a set of physical registers that are available for use, wherein the set of the physical registers that are available for use is updated in response to retirement of an instruction, wherein
    the parent instruction is maintained in the instruction stream.

14. A non-transitory computer-readable medium to store computer-readable code for fabrication of a data processing apparatus comprising:
    detection circuitry configured to detect a parent instruction and a child instruction from a stream of instructions, wherein the parent instruction references a destination register that is referenced as a source register by the child instruction;
    adjustment circuitry configured to adjust the child instruction to produce an adjusted child instruction whose behaviour is logically equivalent to a behaviour of executing the parent instruction followed by the child instruction;
    rename circuitry configured to rename the destination register and the source register from architectural to physical; and
    free physical register storage circuitry configured to identify a set of physical registers that are available for use, wherein the set of the physical registers that are available for use is updated in response to retirement of an instruction, wherein
    the parent instruction is maintained in the instruction stream by the adjustment circuitry.

* * * * *